US007804484B2

(12) United States Patent
Martinez et al.

(10) Patent No.: US 7,804,484 B2
(45) Date of Patent: Sep. 28, 2010

(54) EMBEDDED TEXT INPUT

(75) Inventors: Gregory A. Martinez, Seattle, WA (US); Richard S. Lum, Redmond, WA (US); William Guo, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1037 days.

(21) Appl. No.: 11/480,732

(22) Filed: Jul. 3, 2006

(65) Prior Publication Data
US 2006/0250371 A1 Nov. 9, 2006

Related U.S. Application Data

(63) Continuation of application No. 10/435,256, filed on May 9, 2003, now Pat. No. 7,116,311.

(51) Int. Cl.
G09G 5/00 (2006.01)
(52) U.S. Cl. .................. 345/156; 345/168; 345/169; 345/173; 345/179
(58) Field of Classification Search .......... 345/156, 345/157, 168–179, 184; 341/22; 395/147; 455/550, 554.1, 575.1; 178/17.5; 361/683; 463/36; 715/259
See application file for complete search history.

(56) References Cited

U.S. PATENT DOCUMENTS

| 3,558,820 | A | | 1/1971 | Baisch et al. |
| 3,711,837 | A | | 1/1973 | Smith et al. |
| 5,067,103 | A | | 11/1991 | Lapeyre |
| 5,105,375 | A | | 4/1992 | Lapeyre |
| 5,372,441 | A | | 12/1994 | Louis |
| 5,404,435 | A | | 4/1995 | Rosenbaum |
| 5,535,119 | A | | 7/1996 | Ito et al. |
| 5,774,384 | A | | 6/1998 | Okaya et al. |
| 5,847,697 | A | * | 12/1998 | Sugimoto ............ 345/168 |
| 5,874,906 | A | * | 2/1999 | Willner et al. ............ 341/22 |
| 5,984,548 | A | * | 11/1999 | Willner et al. .......... 400/472 |
| 6,011,578 | A | * | 1/2000 | Shatto et al. ............ 725/14 |
| 6,114,977 | A | | 9/2000 | Smith et al. |
| 6,121,958 | A | * | 9/2000 | Clark et al. ............ 345/168 |
| 6,121,960 | A | * | 9/2000 | Carroll et al. ........... 345/173 |

(Continued)

FOREIGN PATENT DOCUMENTS

WO  WO 03056784 A2  7/2003

OTHER PUBLICATIONS

U.S. Appl. No. 60/341,758 Jason Griffin, Handheld Electronic device with a key board, Research in Motion Limited vol. 341758 specification pp. 1-14, 12-21 2001.*

(Continued)

*Primary Examiner*—Prabodh Dharia
(74) *Attorney, Agent, or Firm*—Woodcock Washburn LLP

(57) ABSTRACT

An input device includes a plurality of character input keys and is operable in a single alphabetic character input mode and a multiple alphabetic character input mode. In the single alphabetic character input mode, an individual character input key is assigned a single alphabetic character, and activating the individual character input key inputs the alphabetic character. In the multiple alphabetic character input mode an individual character input key is assigned multiple alphabetic characters, and the specific character that is input as a result of activating the individual character input key depends upon the number of times the individual character input key is activated.

19 Claims, 10 Drawing Sheets

U.S. PATENT DOCUMENTS

| | | | |
|---|---|---|---|
| 6,177,926 B1 | 1/2001 | Kunert | |
| 6,288,709 B1 | 9/2001 | Willner et al. | |
| 6,292,172 B1 * | 9/2001 | Makhlouf | 345/157 |
| 6,317,061 B1 * | 11/2001 | Batra et al. | 341/22 |
| 6,512,511 B2 | 1/2003 | Willner et al. | |
| 6,587,094 B2 * | 7/2003 | Anderson | 345/168 |
| 6,628,961 B1 | 9/2003 | Ho et al. | |
| 6,847,706 B2 * | 1/2005 | Bozorgui-Nesbat | 379/93.27 |
| 7,017,162 B2 * | 3/2006 | Smith et al. | 719/328 |
| 7,099,708 B2 * | 8/2006 | Ronkko | 455/575.1 |
| 7,581,180 B2 * | 8/2009 | Masui et al. | 715/259 |
| 2001/0045938 A1 * | 11/2001 | Willner et al. | 345/156 |
| 2002/0015609 A1 * | 2/2002 | Webber | 400/489 |
| 2002/0019731 A1 * | 2/2002 | Masui et al. | 704/7 |
| 2002/0067343 A1 * | 6/2002 | Anderson | 345/168 |
| 2002/0077143 A1 | 6/2002 | Sharif et al. | |
| 2002/0122031 A1 | 9/2002 | Maglio et al. | |
| 2002/0136372 A1 * | 9/2002 | Bozorgui-Nesbat | 379/93.18 |
| 2003/0078069 A1 * | 4/2003 | Lindeman | 455/550 |
| 2004/0046021 A1 * | 3/2004 | Chung | 235/386 |
| 2004/0095326 A1 * | 5/2004 | Anderson | 345/168 |
| 2004/0133455 A1 | 7/2004 | McMahon | |
| 2004/0165924 A1 | 8/2004 | Griffin | |
| 2004/0196264 A1 * | 10/2004 | Criscione | 345/168 |
| 2004/0203604 A1 | 10/2004 | Pugliese | |
| 2004/0222970 A1 | 11/2004 | Martinez et al. | |
| 2004/0224763 A1 * | 11/2004 | Lum et al. | 463/36 |
| 2004/0227728 A1 | 11/2004 | McAlindon | |
| 2005/0053225 A1 | 3/2005 | Griffin | |
| 2005/0073446 A1 * | 4/2005 | Lazaridis et al. | 341/22 |
| 2005/0114312 A1 | 5/2005 | Mosescu | |
| 2007/0159466 A1 * | 7/2007 | Kawell et al. | 345/169 |
| 2007/0247800 A1 * | 10/2007 | Smith et al. | 361/683 |

OTHER PUBLICATIONS

"Reviews: ASCII Keyboard Controller;" Internet article printed from http://www.planetgamecube.com/reviews.cfm?action=hwprofile&id=205; date of first publication unknown, but believed prior to May 9, 2003.

Two photographs of ASCII keyboard; date of publication unknown.

"AlphaGrip" web page http://www.alphagrip.com; date of first publication unknown, but believed to be prior to May 9, 2003.

* cited by examiner

EMBEDDED TEXT INPUT

CROSS-REFERENCE TO RELATED APPLICATION

This U.S. Patent Application is a continuation application of and claims priority to U.S. patent application Ser. No. 10/435,256, which was filed in the U.S. Patent and Trademark Office on May 9, 2003, now issued as U.S. Pat. No. 7,116,311, granted on Oct. 3, 2006, and entitled Embedded Text Input, which is entirely incorporated herein by reference.

BACKGROUND OF THE INVENTION

1. Field of the Invention

The present invention relates to a character input device for computer-related systems. The invention concerns, more particularly, a character input device that is usable in a single alphabetic character input mode and a multiple alphabetic character input mode. In the single alphabetic character input mode, a plurality of character input keys are each associated with a single alphabetic character. In the multiple alphabetic character input mode, a portion of the character input keys are disabled, and the remaining portion of the character input keys are each associated with multiple alphabetic characters that are input with one or more activations of the various character input keys. The invention has application to various peripheral input devices for computers and gaming systems.

2. Description of Background Art

Game controllers are frequently used with gaming and computer systems, for example.

Controllers are normally designed to be hand-held, and commonly include a wide variety of user interaction mechanisms such as thumbsticks, D-pads, and various depressible buttons. Due to progressions in video game systems and data transfer capability, some games permit the input of text and other characters. Such text input is commonly performed on a typical, full size keyboard due to the quantity and number of keys used for inputting text.

Attempts have been made to integrate push buttons corresponding to alphabetic keys onto a hand-held game controller. However, such attempts have been less than satisfactory, as the size, number, and/or configuration of the keys and/or the methods of using the keys have not provided a solution that permits for efficient entry of a large number of letters and other characters without drawbacks.

Additionally, other types of reduced-sized devices have provided a large set of reduced sized key buttons permitting entry of letters and other characters. Such devices have been used for wireless transmission and retrieval or emails. These devices commonly include an LCD display region. However, these devices suffer from many of the drawbacks present in the reduced-size keyboard regions of the controllers described above.

SUMMARY OF THE INVENTION

The present invention is a character input device having a plurality of character input keys and at least one mode-altering key for switching between a single alphabetic character input mode and a multiple alphabetic character input mode. Each character input key inputs a single alphabetic character in the single alphabetic character input mode. In the multiple alphabetic character input mode however, a first portion of the character input keys are disabled, and a second portion of the character input keys are each utilized to input multiple alphabetic characters.

In another aspect of the invention, the character input device includes a housing and 26 character input keys. The housing that forms at least a portion of an outer surface of the character input device. The character input keys are accessible from an exterior of the housing, and the character input keys are first labeled with a respective letter of the alphabet. A subset of the 26 character input keys are further labeled with multiple letters for guidance in an operation of the subset of the 26 character input keys in an alternative key entry mode.

Another aspect of the invention involves a method of character input for a computing device. The method includes the steps of once activating a character input key to input a first alphabetic character, and twice activating the character input key to input two of the first alphabetic character. A mode of the input device is then modified such that once activating the character input key inputs a second alphabetic character, and twice activating the character input key inputs a third alphabetic character.

Yet another aspect of the invention is a method of character input for a computing device having a plurality of character keys. The method includes utilizing the character keys under one of a single alphabetic character input mode and a multiple alphabetic character input mode, and then changing the mode. The method also includes utilizing the character keys under the other one of the single alphabetic character input mode and the multiple alphabetic character input mode.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

DETAILED DESCRIPTION OF THE INVENTION

Introduction

Figure 1:
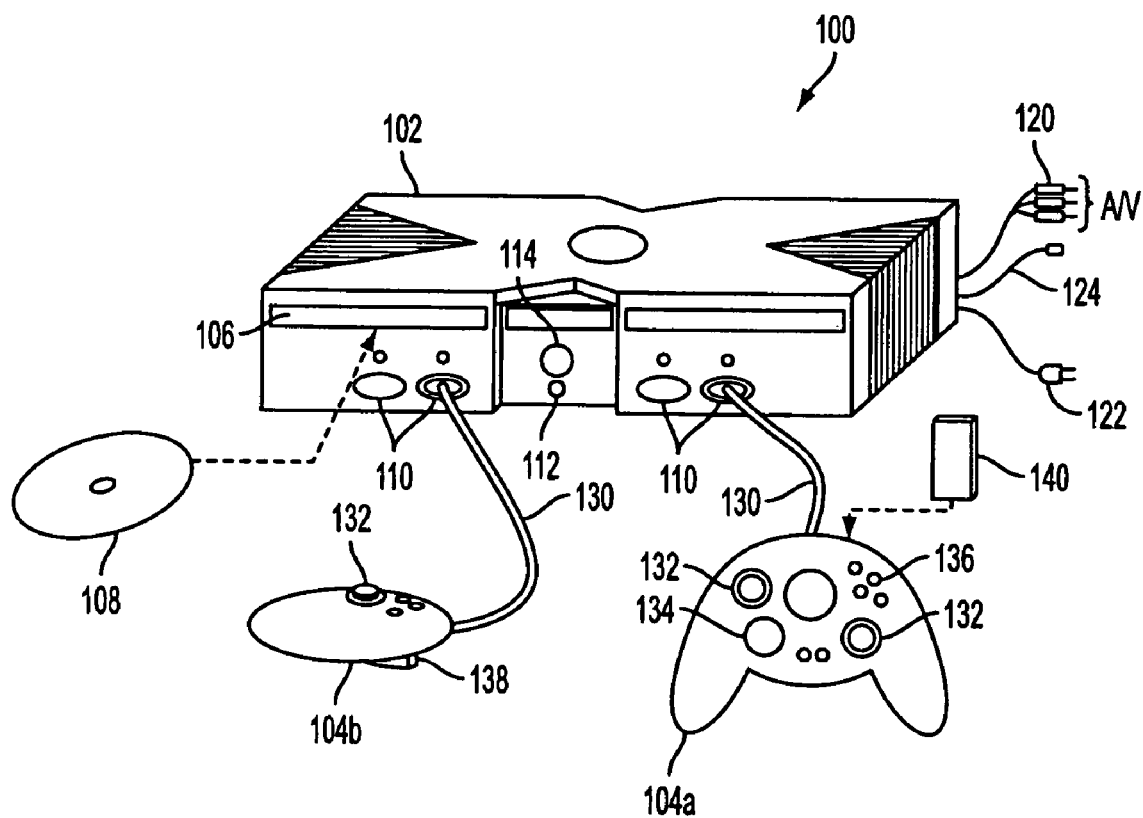
FIG. 1 is a perspective view of an exemplary gaming system.

The following discussion and accompanying figures disclose a character input device in accordance with the present invention. The character input device is usable in a single alphabetic character input mode and a multiple alphabetic character input mode.

As used herein, the phrase "single alphabetic character input mode" is defined as a system wherein character input keys are associated with a single letter of the alphabet. That is, the character input keys are not dedicated to more than one letter of the alphabet. Also as used herein, the phrase "multiple alphabetic character input mode" is defined as a system wherein character input keys are associated with two or more letters of the alphabet. In the multiple alphabetic character input mode, the letter that is input into the system can be dependent upon the process of any desirable limited key text entry system, such as (a) multiple actuations of a single character key, (b) a single activation of a single character key and a disambiguating system.

Accordingly, in the single character input mode, a user will activate a first character input key to input the character "a", the user will activate a second character input key to input the character "b", and the user will activate a third character input key to input the character "c", for example.

In the multiple alphabetic character input mode, however, a portion of the character input keys are disabled, and a subset of keys, such as 9 to 12, remain active after this mode switch. This subset of character input keys are each associated with multiple alphabetic characters. Any known system for entry may be used in this mode and many systems exist for text entry on mobile telephones. This subset may be operable based on a system that associated a predetermined number of key inputs of with a specific letter. For example, a particular character key may be associated with predetermined letters "a", "b" and "c". The user may once activate a character input key to input the character "a", twice consecutively activate the character input key to input the character "b", or thrice consecutively activate the character input key to input the character "c", for example. The letters associated with the character keys need not be alphabetical like (as exist in many telephone devices) and may be in alternative grouping such as is shown in U.S. Pat. No. 5,818,437.

In lieu the subset being operable based on a system that associated a predetermined number of key inputs of with a specific letter, the system may provide for a single input of a character based on the activation of the key associated with multiple letters (i.e., an ambiguous entry system). The controller is preferably provided with a disambiguating process and the user may select a specific word in the event that the pressing specific keys result in multiple possible words. Such systems and processes are disclosed in U.S. Pat. Nos. 5,818, 437, 5,945,928, 5,953,541, 6,011,554, 6,286,064, 6,307,548, and 6,307,549, and are hereby incorporated by reference.

The character input device and, more specifically, the operation of the character input device are disclosed with reference to a gaming system. The present invention, however, has application to a wide variety of products where character input is utilized, including personal computer systems and hand-held electronic devices, such as personal data assistants, for example. Accordingly, one skilled in the relevant art will recognize that the present invention may be applied to a variety of products, in addition to the specific applications related to gaming systems disclosed herein.

Exemplary Gaming System

Various aspects of the present invention may be implemented in connection with gaming systems, as discussed above. Accordingly, an enhanced understanding of the invention may be gained by briefly discussing the components and operation of an exemplary gaming system 100, as depicted in FIG. 1, on which various embodiments of the invention may be employed. The gaming system 100 includes a game console 102 and up to four controllers, as represented by controllers 104a and 104b. The game console 102 is equipped with an internal hard disk drive and a portable media drive 106 that supports various forms of portable storage media 108, as represented by an optical storage disc. Examples of suitable portable storage media 108 include DVD, CD-ROM, game discs, and so forth.

The game console 102 has four slots 110 on its front face to support up to four controllers 104a and 104b, although the number and arrangement of slots may be modified. A power button 112 and an eject button 114 are also positioned on the front face of the game console 102. The power button 112 switches power to the game console, and the eject button 114 alternately opens and closes a tray of the portable media drive 106 to allow insertion and extraction of the portable storage media 108.

The game console 102 connects to a television or other display via A/V interfacing cables 120. A power cable 122 provides power to the game console. The game console 102 may further be configured with broadband capabilities, as represented by the cable or modem connector 124 to facilitate access to a network, such as the Internet.

Each controller 104a and 104b is coupled to the game console 102 via a wired or wireless interface. In the illustrated implementation, the controllers are USB (Universal Serial Bus) compatible and are connected to the console 102 via serial cables 130. The controllers 104a and 104b may be equipped with any of a wide variety of user interaction mechanisms. As illustrated in FIG. 1, controller 104a is equipped with two thumbsticks 132, a D-pad 134, and a variety of buttons 136. Controller 104b includes one thumbstick 132, button 136, and a trigger 138. These mechanisms are merely representative, and other known interaction mechanisms may be substituted for or added to those shown in FIG. 1.

A memory unit 140 may be inserted into either of the controllers 104a or 104b or into the game console 102 to provide additional and portable storage. A portable memory unit 104 enables users to store game parameters and port them for play on other consoles that are similar to console 102. For example, a user may save a game to memory unit 140 using the game console 102 then use that saved game data with a game executed on a different game console. In the described implementation, each controller is configured to accommodate two memory units 140, although more or less than two units may be employed in other implementations. A particular game console 102 may be configured to accommodate any number of memory units 140.

The gaming system 100 is capable of playing, for example, games, music, and videos.

With the different storage offerings, titles can be played from the hard disk drive or the portable storage media 108 in portable media drive 106, from an online source, or from a memory unit 140. Examples of media that the gaming system 100 is capable of operating include: (1) Game titles played from CD and DVD discs, from the hard disk drive, or from an online source; (2) Digital music played from a CD in the portable media drive 106, from a file on the hard disk drive (e.g., WINDOWS MEDIA Audio (WMA) format), or from online streaming sources; and (3) Digital audio/video played from a DVD disc in the portable media drive 106, from a file on the hard disk drive (e.g., Active Streaming Format), or from online streaming sources.

Figure 2:
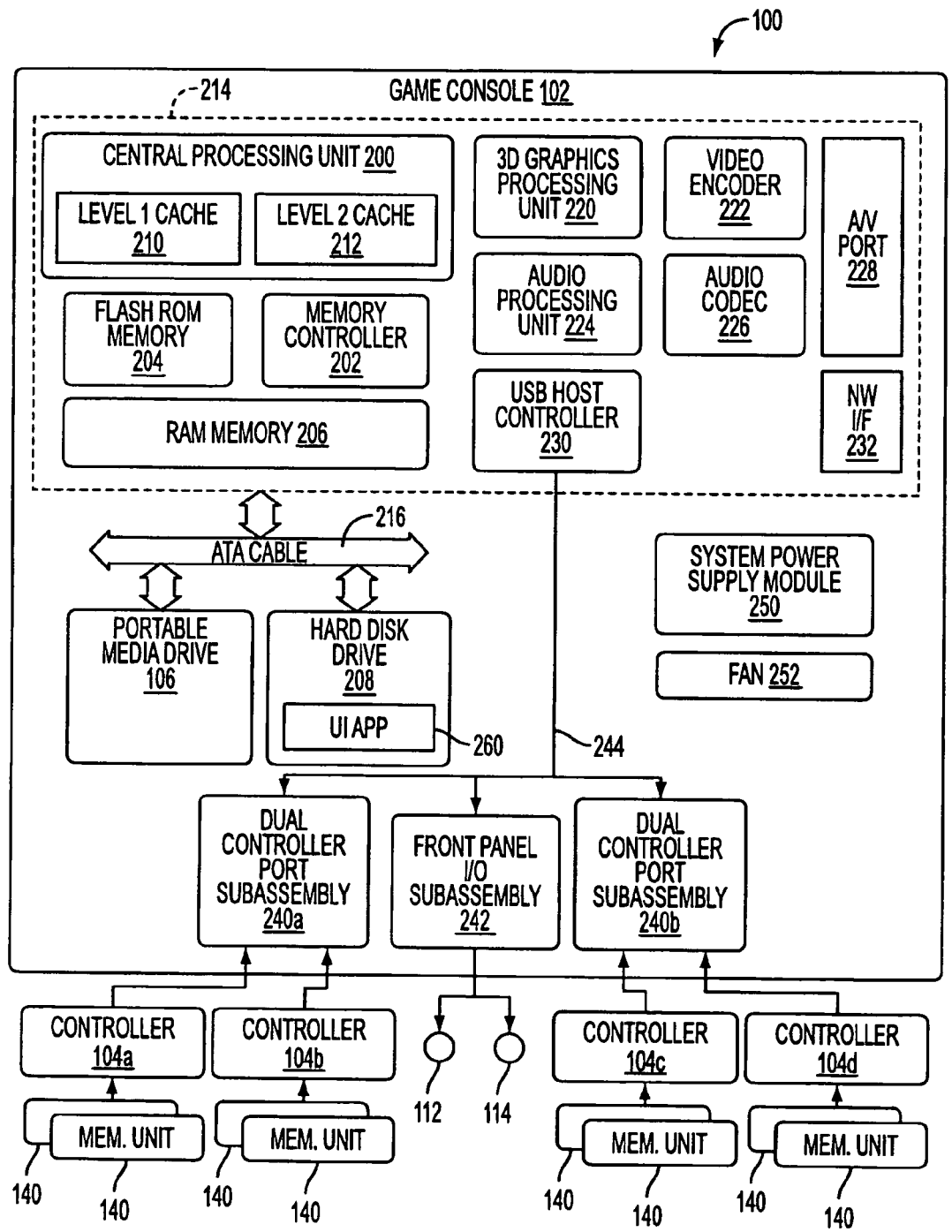
FIG. 2 is a block diagram of the gaming system.

FIG. 2 depicts functional components of the gaming system 100 in further detail. The game console 102 has a CPU (central processing unit) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and, therefore, reduce the number of memory access cycles to improve processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus, also known as a Mezzanine bus.

As one suitable implementation, the CPU. 200, memory controller 202, ROM 204, and RAM 206 are integrated onto a common module 214. In this implementation, ROM 204 is configured as a flash ROM that is connected to the memory controller 202 via a PCI (Peripheral Component Interconnect) bus and a ROM bus (neither of which are shown).

RAM 206 is configured as multiple DDR SDRAM (Double Data Rate Synchronous Dynamic RAM) that are independently controlled by the memory controller 202 via separate buses (not depicted). The hard disk drive 208 and portable media drive 106 are connected to the memory controller 202 via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not depicted). An audio processing unit 224 and an audio codec (coder/decoder) 226 form a corresponding audio processing pipeline with high fidelity and stereo processing. Audio data is carried between the audio processing unit 224 and the audio codec 226 via a communication link (not depicted). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the controllers 104a and 104b and additional controllers 104c and 104d. The network interface 232 provides access to a network (e.g., the Internet, home network, etc.) and may be any of a wide variety of various wired or wireless interface components including an Ethernet card, a modem, a Bluetooth module, a cable modem, and the like.

The game console 102 has two dual controller support subassemblies 240a and 240b, with each subassembly supporting two of the controllers 104a-104d. A front panel I/O subassembly 242 supports the functionality of the power button 112 and the eject button 114, as well as any LEDs (light emitting diodes) or other indicators exposed on the outer surface of the game console. The subassemblies 240a, 240b, and 242 are coupled to the module 214 via one or more cable assemblies 244.

Eight memory units 140 are illustrated as being connectable to the four controllers 104a-104d (i.e., two memory units for each controller). Each memory unit 140 offers additional storage on which games, game parameters, and other data may be stored.

When inserted into a controller, the memory unit 140 can be accessed by the memory controller 202. Additionally, one or more memory units 140 may be inserted into game console 102 and accessed by the memory controller 202. A system power supply module 250 provides power to the components of the gaming system 100. A fan 252 cools the circuitry within the game console 102.

The game console 102 implements a uniform media portal model that provides a consistent user interface and navigation hierarchy to move users through various entertainment areas. The portal model offers a convenient way to access content from multiple different media types—game data, audio data, and video data—regardless of the media type inserted into the portable media drive 106. To implement the uniform media portal model, a console user interface (UI) application 260 is stored on the hard disk drive 208. When the game console is powered on, various portions of the console application 260 are loaded into RAM 206 and/or caches 210 and 212 and executed on the CPU 200. The console application 260 presents a graphical user interface that provides a consistent user experience when navigating to different media types available on the game console. Thus, the hard disk drive 208 (and the data stored thereon) is an important part of the initialization process. If the hard disk drive 208 is not functioning properly, the gaming system 100 may not boot successfully.

The gaming system 100 may be operated as a standalone system by simply connecting the system to a television or other display. In this standalone mode, the gaming system 100 allows one or more players to play games, watch movies, or listen to music.

However, with the integration of broadband connectivity made available through the network interface 232, the gaming system 100 may further be operated as a participant in a larger network gaming community.

Figure 3:
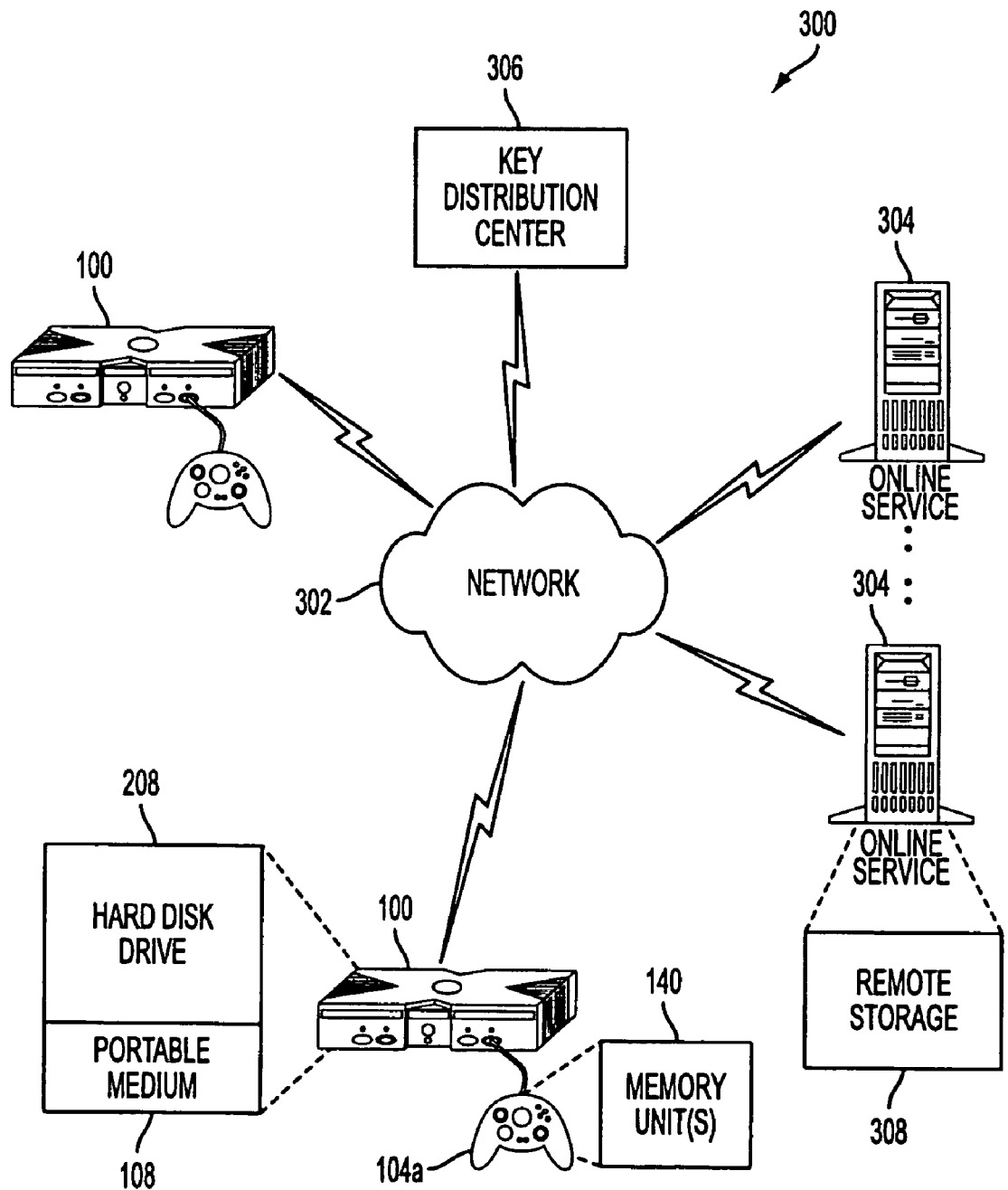
FIG. 3 is a schematic view of a network that incorporates the gaming system.

FIG. 3 depicts an exemplary network gaming environment 300 that interconnects multiple gaming systems 100 via a network 302. The network 302 represents any of a wide variety of data communications networks. It may include public portions (e.g., the Internet) as well as private portions (e.g., a residential Local Area Network (LAN)), as well as combinations of public and private portions. Network 302 may be implemented using any one or more of a wide variety of conventional communications media including both wired and wireless media. Any of a wide variety of communications protocols can be used to communicate data via network 302, including both public and proprietary protocols. Examples of such protocols include TCP/IP, IPX/SPX, NetBEUI, etc.

In addition to gaming systems 100, one or more online services 304 may be accessible via the network 302 to provide various services for the participants, such as hosting online games, serving downloadable music or video files, hosting gaming competitions, serving streaming audio/video files, and the like. The network gaming environment 300 may further involve a key distribution center 306 that plays a role in authenticating individual players and/or gaming systems 100 to one another as well as online services 304. The distribution center 306 distributes keys and service tickets to valid participants that may then be used to form games amongst multiple players or to purchase services from the online services 304.

The network gaming environment 300 introduces another memory source available to individual gaming systems 100, online storage. In addition to the portable storage media 108, the hard disk drive 208, and the memory units 140, the gaming system 100 may also access data files available at remote storage locations via the network 302, as exemplified by remote storage 308 at online service 304.

Input Device

Figure 4:
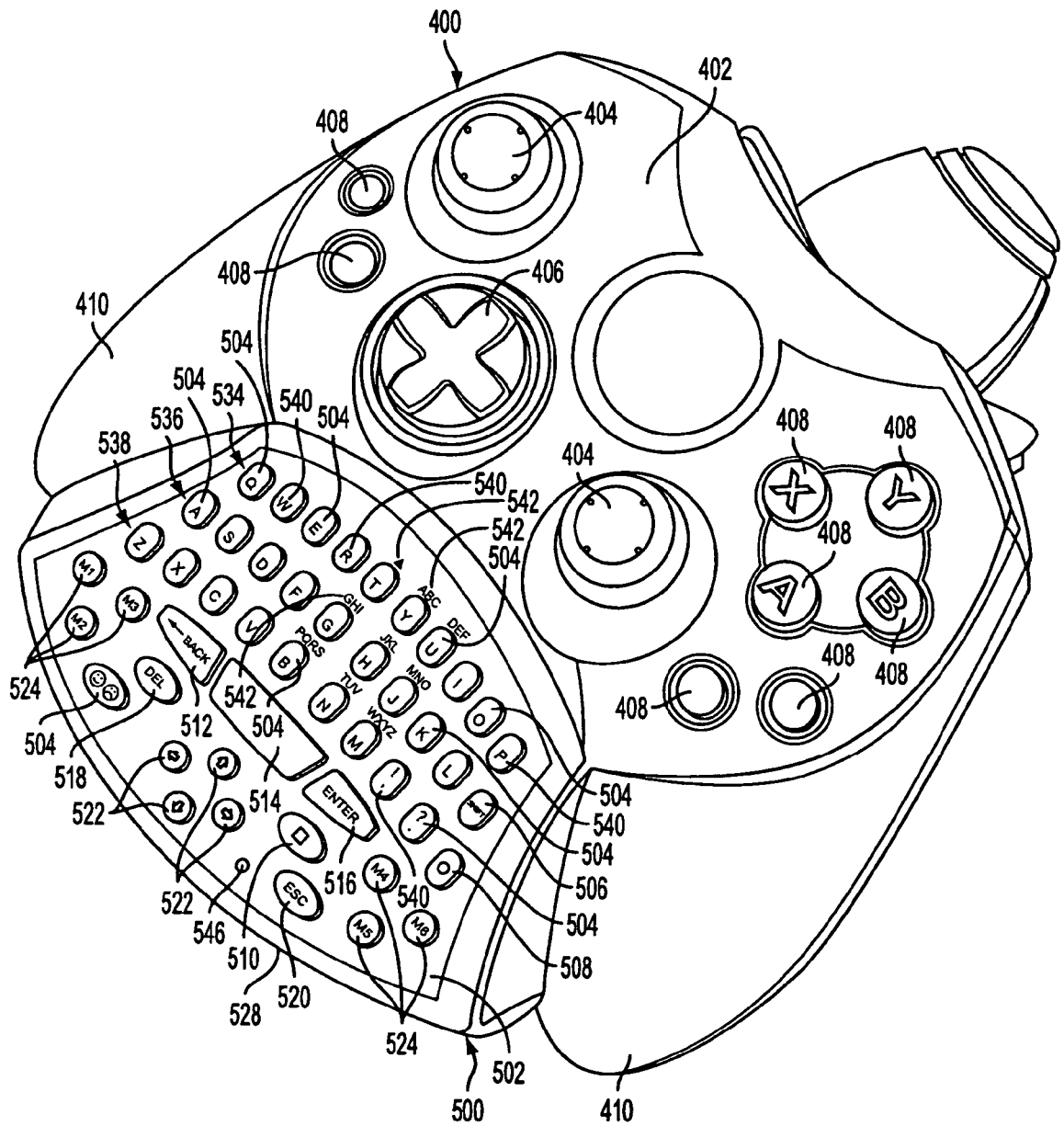
FIG. 4 is a perspective view of an input device having a game controller portion and a first character input portion with a first character configuration.
Figure 5:
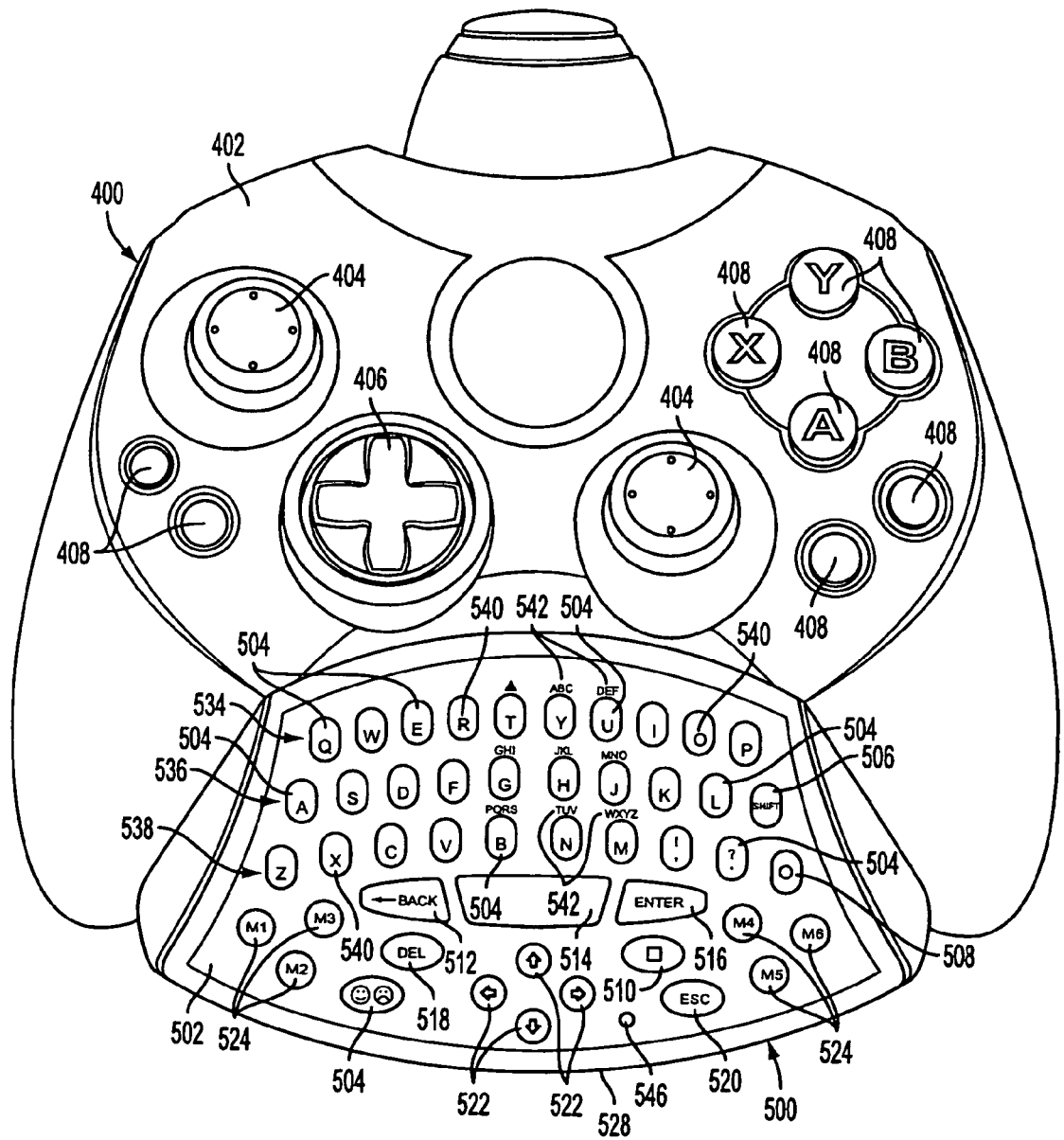
FIG. 5 is a top plan view of the input device.

An input device that is a combination of a game controller portion 400 and a character input portion 500 is disclosed in FIGS. 4 and 5. Within the scope of the present invention, the term "input device" is defined as any implement that transmits a signal to a computing device, such as the game console 102, in response to user interaction with the input device. The game controller portion 400 includes a plurality of interaction mechanisms that are operated by a user to direct game play. Similarly, the character input portion 500 also includes a plurality of interaction mechanisms that are operated by the user to input various characters. Accordingly, the game controller portion 400 and the character input portion 500 each transmit signals to the game console 102 based upon user interaction and may be considered an input device individually or in combination.

The various features and operation of the game controller portion 400 are well-known in the art and will not be discussed at length here. In general, however, the game controller portion 400 has the configuration and function of the controllers 104a-104d discussed above. Accordingly, the game controller portion 400 may be coupled to the game console 102 via a wired or wireless interface. The game controller portion 400 may also be USB compatible, thereby connecting to the game console 102 via a serial cable. A housing 402 forms a majority of an exterior surface of the game controller portion 400 and is shaped to interface with hands of a user. A variety of user interaction mechanisms protrude from housing 402 and include two thumbsticks 404, a D-pad 406, and a variety of buttons 408. A pair of triggers may also be positioned under a pair of grips 410, which are formed from the housing 402 and provide an area for grasping the game controller portion 400 during use. The game controller portion 400 also includes a pair of slots (not depicted) that may each receive one of memory units 140 to provide additional and portable storage. The game controller portion 400 may be configured, however, to accommodate any number of memory units 140. The structure of the game controller portion 400 and the various interaction mechanisms described herein are merely representative, and other structures or interaction mechanisms may be substituted for or added to those shown in the FIGS. 4 and 5.

Figure 6:
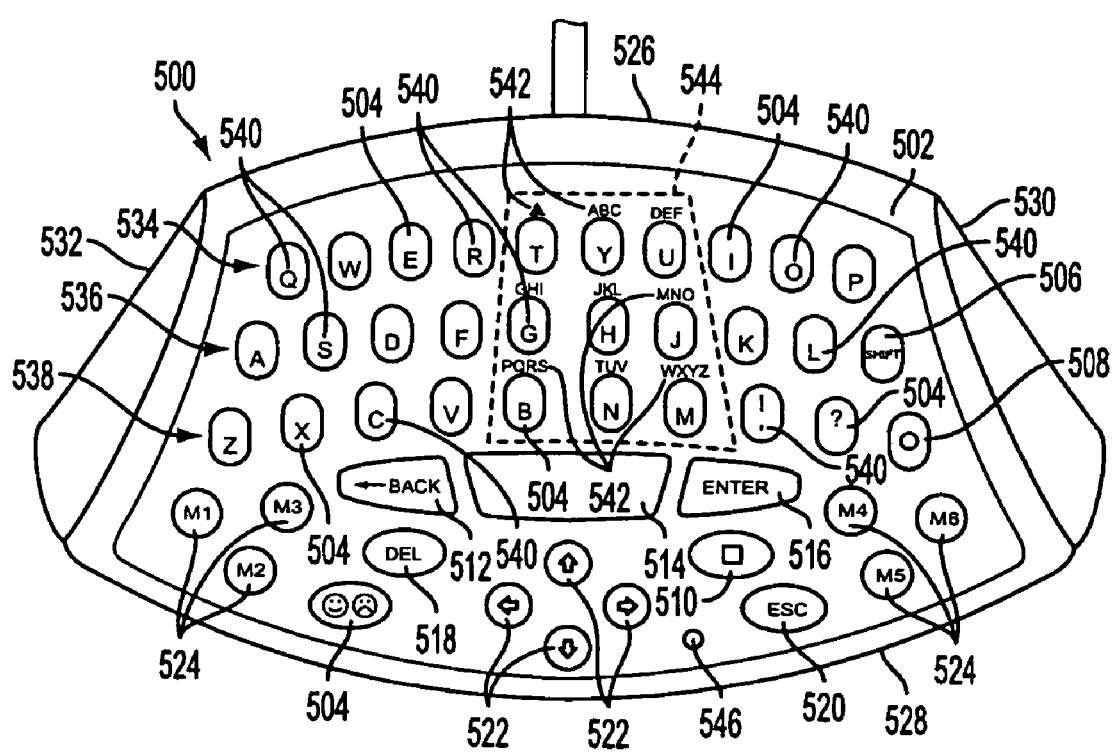
FIG. 6 is a top plan view of the first character input portion.

The character input portion 500, depicted individually in FIG. 6, is detachably-secured to the game controller portion 400 and may be utilized to enter various characters during game play. The characters may be utilized to provide identifiers for various players, or to facilitate communication among the various players, for example. The term character, as utilized herein, is intended to encompass a symbol or other figure that may be entered by the individual with the character input portion 500. Examples of characters include alphabetic characters, whether from the Roman, Cyrillic, Arabic, Hebrew, or Greek alphabets, for example. Furthermore, a character may be a numeral, a punctuation mark, or one of the various symbols that are commonly utilized in written or printed text, such as $, #, %, &, or @, for example. In addition, a character may be one of the various symbols utilized in Asian languages, such as the Chinese, Japanese, and Korean languages.

The character input portion 500 interfaces mechanically and electrically with the game controller portion 400. With regard to the mechanical interface, the character input portion 500 includes a housing 502 that is shaped to abut the housing 402 between the grips 410. An arm (not depicted) or other connection device that detachably-connects to both the game controller portion 400 and the character input portion 500 may extend under both components to secure the components together. Such a mechanical interface permits the character input portion 500 to be detached from the game controller portion 400 when not in use. Regarding the electrical interface, the character input portion 500 may include a connector that electrically-joins with one of the slots that receive the memory units 140 in the game controller portion 400. Within the scope of the present invention, the character input portion 500 may interface mechanically and electrically with the game controller portion 400 through a plurality of other mechanisms. For example, magnetic connectors or other mechanical connection devices may be utilized to detachably-secure the character input portion 500 to the game controller portion 400.

Furthermore, a wireless connection may be utilized to form the electrical interface between the character input portion 500 to the game controller portion 400. As an alternate structure, the character input portion 500 may also electrically interface directly with the game console 102.

When the user holds the input device, which includes the game controller portion 400 and the character input portion 500, in both hands, the palms of the hands are in full contact with the grips 410 and the thumbs or other fingers may extend over the character input portion 500. In this position, the distance by which the palms are separated may be approximately 7.5 inches or less, or may be between 5.63 and 6.38 inches, for example.

The character input portion 500 extends between the grips 410. Accordingly, the character input portion 500 has a width dimension that is less than the distance by which the palms are separated, and the width dimension is substantially less than the width of a conventional keyboard, for example.

A plurality of keys associated with the character input portion 500 are accessible by the user while operating the character input portion 500. The keys may have a depressible structure, for example, that protrudes through an upper surface of the housing 502.

Alternately, the keys may be touch-sensitive. The various keys include a plurality of character input keys 504, a first mode-altering key 506, a second mode-altering key 508, a third mode-altering key 510, a backspace key 512, a space key 514, an enter key 516, a delete key 518, an escape key 520, four arrow keys 522, and six modifiable keys 524.

For reference purposes, the character input portion 500 has a back edge 526 distal from the user during normal use, and a front edge 528 adjacent the user during normal use.

Accordingly, an object is said herein to be "behind" another object when it is between that object and the back edge 526. An object is said herein to be "in front of" another object when it is between that object and the front edge 528. Further, the character input portion 500 also has a right edge 530 and a left edge 532. The direction "lateral" defines the general directions from the right edge 530 to the left edge 532, and from the left edge 532 to the right edge 530.

The character input keys 504 are generally arranged in three rows 534, 536, and 538 that extend in the lateral direction. The first row 534 includes ten of the character input keys 504 and is positioned in front of the back edge 526 and behind the second row 536. The second row 536 includes nine of the character input keys 504 and is positioned in front of the first row 534 and behind the third row 538. Similarly, the third row 538 includes nine of the character input keys 504 and is positioned in front of the second row 536 and behind the backspace key 512, the space key 514, and the enter key 516.

In addition, one character input key 504 is positioned adjacent and behind the front edge 528. Based upon the above discussion and the figures, the character input portion 500 includes twenty-nine character input keys 504.

Many of the character input keys 504 are associated with alphabetic characters and have a corresponding primary character identifier 540 located thereon. The two character input keys 504 positioned on a right side of the third row 538, however, are not associated with alphabetic characters and include primary character identifiers 540 related to various punctuation marks. Similarly, the character input key 504 positioned adjacent and behind the front edge 528 includes primary character identifiers 540 corresponding with a smiling face and a frowning face.

As depicted in FIGS. 4-6, the various primary character identifiers 540 are located on the character input keys 504. The primary character identifiers 540 provide identification regarding the various characters that may be input with each character input key 504. For example, the character input key 504 positioned in the first row 534 and adjacent the left edge 532 has one primary character identifier 540 located thereon having the form of the alphabetic character "Q". A user will intuitively understand, therefore, that this specific character input key 504 may be utilized to enter the lowercase alphabetic character "q" and the uppercase alphabetic character "Q". In addition, the character input key 504 positioned in the second row 536 and adjacent the left edge 532 has one primary character identifier 540 located thereon having the form of the alphabetic character "A".

The user will intuitively understand, therefore, that this specific character input key 504 may be utilized to enter the lowercase alphabetic character "a" and the uppercase alphabetic character "A". As a further example, the character input key 504 positioned in the third row 538 and adjacent the second mode-altering key 508 has two primary character identifiers 540 located thereon having the form of the punctuation marks "." and "?", which may be input by the user by activating this character input key 504.

The following discussion will reference specific character input keys 504 based upon the primary character identifier 540 located thereon. For example, the character input key 504 positioned in the first row 534 and adjacent the left edge 532, which has the primary character identifier 540 with the form of the alphabetic character "Q" located thereon, will be referred to in the following discussion as the Q key 504. Similarly, the character input key 504 positioned in the second row 53 and adjacent the left edge 532, which has the primary character identifier 540 with the form of the alphabetic character "A" located thereon, will be referred to in the following discussion as the A key 504.

A portion of the character input keys 504 also have secondary character identifiers 542 adjacently-located on the housing 502. Referring to FIG. 6, an area 544 is outlined for purposes of reference. Each of the character input keys 504 within the area 544 is associated with one of the secondary character identifiers 542. For example, adjacent to the Y key 504 are the secondary character identifiers 542 with the form of the alphabetic characters "ABC". Similarly, adjacent to the M key 504 are the secondary character identifiers 542 with the form of the alphabetic characters "WXYZ". Whereas many of the character input keys 504 within the area 544 have secondary character identifiers 542 with an alphabetic form, the T key 504 includes one secondary character identifier 542 with the form of a "▲". As will be described in greater detail below, the T key 504 may be utilized for shifting between uppercase and lowercase characters.

The mode-altering keys 506, 508, and 510 may be utilized in combination with the character input keys 504 such that each of the character input keys 504 have the capacity to input multiple characters. In general, however, many of the character input keys positioned outside of the area 544 only have the ability to input a single alphabetic character, although both the uppercase and lowercase forms of the alphabetic character may be input. The first mode-altering key 506 is positioned in the second row 536 and adjacent to the right edge 530, and the indicia "shift" is located on a top surface of the first mode-altering key 506. The first mode-altering key may be utilized to switch between entering lowercase characters and uppercase characters. In the absence of activating the first mode-altering key 506, many of the character input keys 504 will input a lowercase alphabetic character. For example, the Q key 504 will input the lowercase alphabetic character "q" when the first mode-altering key 506 is not activated. When the first mode-altering key 506 is activated and then the Q key 504 is activated, however, the uppercase alphabetic character "Q" will be input. Accordingly, the first mode-altering key 506 may be utilized to input uppercase alphabetic characters.

Once activating the first mode-altering key 506 and then activating one of the character input keys 504 will input an uppercase alphabetic character. Subsequent activations of the character input keys 504, without an associated activation of the first mode-altering key 506, will input lowercase alphabetic characters. If the user intends to input a series of uppercase alphabetic characters, the user may twice activate the first mode-altering key 506. Subsequent activations of the character input keys 504 will input uppercase alphabetic characters until the user again activates the first mode-altering key 506. Accordingly, the user may lock the character input portion 500 into an uppercase mode by twice activating the first mode-altering key 506. Also, the user may unlock the character input portion 500 from the uppercase mode by again activating the first mode-altering key 506.

In the absence of activating the second mode-altering key 508, the two character input keys 504 positioned on a right side of the third row 538 may be utilized to input the characters "," and ".". When the second mode-altering key 506 is activated and then one of the two character input keys 504 positioned on a right side of the third row 538 are also activated, the punctuation mark characters "!" and "?" may be input. Accordingly, the second mode-altering key 508 may be utilized to input the different punctuation marks identified as the primary character identifiers 540.

Based upon the above discussion, the character input keys 504 having alphabetic characters as primary character identifiers 540 may be utilized in a primary input mode (also referred to as a single alphabetic character input mode) to input the various characters identified by the primary character identifiers 540. The primary input mode is somewhat similar to the manner in which a conventional keyboard for a computing device is utilized. That is, lowercase alphabetic characters are entered as a default, and the user may utilize a "shift key" (e.g., the first mode-altering key 506) to input uppercase alphabetic characters. In addition to the primary input mode, the user may also utilize the character input portion 500 to input characters through a secondary input mode (also referred to as a multiple alphabetic character input mode). To enter the secondary input mode, the user will activate the third mode-altering key 510, which deactivates the character input keys 504 that are positioned outside of the area 544. By activating the various character input keys within the area 544, the user may input the various characters identified by the secondary character identifiers 542. When in the secondary input mode, for example, the user may activate the Y key 504 to input the character "a". Similarly, the user may twice activate the Y key 504 to input the character "b", or thrice activate the Y key 504 to input the character "c". Accordingly, the third mode-altering key 510 may be utilized to input characters associated with the secondary character identifiers 542. Further discussion regarding the secondary input mode will be provided below.

The various keys 512-522 may be utilized in a manner that is consistent with a conventional keyboard. Accordingly, the backspace key 512 may be utilized to erase a character that is behind a cursor, the space key 514 may be utilized to form a space between two characters, the enter key 516 may be utilized to affirmatively enter various characters, and the delete key 518 may be utilized to delete a character that is in front of the cursor, for example. The escape key 520 may be utilized for exiting various graphical user interfaces, and the various arrow keys 522 may be utilized to move the cursor in a direction that is consistent with indicia having the shape of an arrow and located thereon. Accordingly, the keys 512-522 may have a use that is similar to corresponding keys on a keyboard or other input device. Within the scope of the present invention, however, alternate uses may be associated with the various keys 512-522.

The character input portion 500 also includes six modifiable keys 524 that each bear one of the following indicia: M1, M2, M3, M4, M5, and M6. The functions associated with each of the modifiable keys 524 may be modified by the user. For example, the user may set each of the modifiable keys 524 such that a series of characters are input when activated. The modifiable keys 524 may also have functions that vary depending upon the specific software application that is being utilized in connection with the character input portion 500.

Based upon the above discussion, the character input portion 500 has a structure that mechanically and electrically interfaces with the game controller portion 400 and may, therefore, be detachably-secured to the game controller portion 400. The character input portion 500 includes a plurality of character input keys 504 that are associated with a plurality of characters. By activating the character input keys 504, signals indicative of various characters may be transmitted to the game console 102, thereby inputting characters. By also activating one of the mode-altering keys 506, 508, and 510, signals indicative of various other characters may be transmitted to the game console 102.

Procedures For Utilizing The Input Modes

The primary input mode generally associates a single alphabetic character with a single character input key 504. For example, the Q key 504 may be utilized to enter the lowercase alphabetic character "q" and the uppercase alphabetic character "Q". Given that the alphabet utilized for the English language includes twenty-six alphabetic characters, at least twenty-six character input keys 504 are required for the primary input mode. Additional character input keys 504 may also be utilized for inputting punctuation marks, numbers, or other characters. Whereas at least twenty-six character input keys 504 are utilized in the primary input mode, a lesser number of character input keys 504 are operational in the secondary input mode. For example, the configuration of the character input portion 500 in FIGS. 4-6 utilizes nine character input keys 504 in the secondary input mode. In general, the number of character input keys 504 utilized in the secondary input mode may range from nine to twelve, but may be a lesser or greater number depending upon the specific application.

In utilizing the primary input mode, the specific character input key 504 bearing the primary character identifier 540 that corresponds with the character the user intends to input is located. The user then determines whether the inputted character should be lowercase or uppercase. If the character should be lowercase, the user merely activates the character input key 504 to input the character. If the character should be uppercase, however, the user activates the first mode-altering key 506 and then activates the character input key 504 to input the character.

As discussed above, once activating the first mode-altering key 506 and then activating one of the character input keys 504 will input an uppercase alphabetic character. Subsequent activations of the character input keys 504, without an associated activation of the first mode-altering key 506, will input lowercase alphabetic characters. If the user intends to input a series of uppercase alphabetic characters, the user may twice activate the first mode-altering key 506. Subsequent activations of the character input keys 504 will input uppercase alphabetic characters until the user again activates the first mode-altering key 506. Accordingly, the user may lock the character input portion 500 into an uppercase mode by twice activating the first mode-altering key 506. Also, the user may unlock the character input portion 500 from the uppercase mode by again activating the first mode-altering key 506.

The character input keys 504 are arranged in the manner of the various keys on a conventional QWERTY-type keyboard. A user that is familiar with the relative positions of the various keys on the conventional QWERTY-type keyboard will, therefore, be relatively proficient at inputting characters in the primary input mode. When operating the character input portion 500, the hands of the user generally extend around the grips 410 and the thumbs extend over the character input portion 500 to activate the various character input keys 504. In contrast with the operation of the conventional QWERTY-type keyboard, therefore, the user will activate the various character input keys 504 with the thumbs rather than the multiple fingers.

The process for utilizing the secondary input mode is similar to the process of entering characters with a cellular telephone or other device that has limited space and a limited number of character entry keys. With regard to the cellular telephone, for example, many individual have become proficient at entering characters with one or both thumbs. For this reason, some individuals may prefer to utilize the character input portion 500 in the secondary input mode. In contrast with the primary input mode, the secondary input mode generally associates multiple alphabetic characters with a single character input key 504. For example, the Y key 504 may be utilized to enter the lowercase alphabetic characters "abc" and the uppercase alphabetic character "ABC". Accordingly, a significantly reduced number of character input keys 504 are utilized in the secondary input mode.

The primary input mode is generally the default input mode for the character input portion 500. Accordingly, when a user initially secures the character input portion 500 to the game controller portion 400, thereby operatively connecting the character input portion 500 to the game console 102, the character input portion 500 is set to the primary input mode. If the user intends to utilize the character input portion 500 in the primary input mode, then the user may activate the various character input keys 504 to input the characters represented by the primary character identifiers 540, as discussed above. If the user intends to utilize the character input portion 500 in the secondary input mode, however, then a mode change input is provided, which may include activating the third mode-altering key 510, for example. As utilized herein, the term "mode change input" is any input that changes the character input portion 500 from the primary input mode to the secondary input mode, or changes the character input portion 500 from the secondary input mode to the primary input mode. For example, the mode change input may involve merely once activating the third mode-altering key 510; the mode change input may involve twice activating the third mode-altering key 510; or the mode change input may involve activating any predetermined combination of keys, which may or may not include the third mode-altering key 510. In either event, the user provides the mode change input to selectively switch between the primary input mode to the secondary input mode.

Once the mode change input is provided, the character input keys 504 located outside of the area 544 are disabled. Accordingly, if the user activates the Q key 504, for example, no input will be provided. In general, only the character input keys 504 located outside of the area 544 are disabled, and input may still be entered by activating the backspace key 512, the space key 514, the enter key 516, and the various other non-character input keys located outside of the area 544. In some configurations of the present invention, however, all keys outside of the area 544 may be disabled.

When the character input portion 500 is in the secondary input mode, the user may activate the various character input keys 504 that are positioned within the area 544 to enter the characters identified by the secondary character identifiers 542. In the primary input mode, each character is input through a single activation of the corresponding character input key 504. In the secondary input mode, however, each character is input through one or multiple activations of the corresponding character input key 504, as identified by the secondary character identifiers 542.

The manner of entering characters in the second input mode will now be discussed in relation to the Y key 504. The secondary character identifiers 542 positioned adjacent the Y key 504 include an "a", "b", and "c", with "a" being in the first (left) position, "b" being in the second (middle) position, and "c" being in the third (right) position. This order determines the specific character that is entered following each activation of the Y key 504. In general, therefore, once activating the Y key 504 inputs the lowercase alphabetic character "a", twice activating the Y key 504 inputs the lowercase alphabetic character "b", and thrice activating the Y key 504 inputs the lowercase alphabetic character "c". Note that the B key 504 and the M key 504 each include four characters in the secondary character identifiers 542. In order to enter the characters "s" and z respectively, the user will activate the B key 504 or the M key 504 four times.

Uppercase alphabetic characters may also be input in the secondary input mode, by activating the T key 504 prior to activating the Y key 504. Accordingly, the uppercase alphabetic character "A" may be entered by first activating the T key 504 and then once activating the Y key 504. Similarly, the uppercase alphabetic character "B" may be entered by first activating the T key 504 and then twice activating the Y key 504, and the uppercase alphabetic character "C" may be entered by first activating the T key 504 and then thrice activating the Y key 504. Alternately, the T key 504 may have a different function, and the uppercase alphabetic characters may be entered by further activating the character input keys 504. For example, the uppercase alphabetic characters "A", "B", and "C" may be entered by activating the Y key 504 four, five, and six times, respectively. As a further alternative, the first mode-altering key 506 may be utilized in connection with the character input keys 504 located within the area 544 to input uppercase alphabetic characters.

With reference to the principles outlined in the above discussion, the manner in which the user will input the word "dog" will be discussed. The secondary character identifiers 542 associated with the U key 504 includes the character "d" in the first position. In order to enter the character "d", therefore, the user will once activate the D key 504. The secondary character identifiers 542 associated with the J key 504 includes the character "o" in the third position. In order to enter the character "o", therefore, the user will thrice activate the J key 504. Similarly, the secondary character identifiers 542 associated with the G key 504 includes the character "g" in the first position. In order to enter the character "g", therefore, the user will once activate the G key 504. In this manner, the user may input the series of characters that form the word "dog".

Situations may arise wherein two consecutive characters that the user intends to input are associated with the same character input key 504. Assume, for example, that the user intends to enter the word "bat". Inputting the character "b" requires two activations of the Y key 504, and inputting the character "a" requires one activation of the Y key 504. The individual will, therefore, activate the Y key 504 three times. At this point, one skilled in the relevant art will recognize that three activations of the Y key 504 generally inputs the character "c", rather than the pair of characters "b" and "a". In general, if the user pauses a predetermined period of time following an activation of a character input key 504, then a character will be input and the same character input key 504 may be utilized to input another character. Accordingly, twice activating the Y key 504 and pausing for a predetermined period of time will input the character "b", and then once activating the Y key 504 will input the character "a". In this manner two consecutive characters that are associated with the same character input key 504 may be input. The length of the predetermined period of time may vary within the scope of the present invention, and may be set to 500 milliseconds, for example.

The character input keys 504 within the area 544 may be utilized to input a variety of characters, in addition to the characters associated with the various secondary character identifiers 542. For example, activating the Y key 504 four times may input the numeric character "1", and activating the U key 504 four times may input the numeric character "2". Alternately, further activations of the various character input keys 504 within the area 544 may input punctuation marks, various symbols, or other characters.

In the primary input mode the various character input keys 504 are associated with at most one alphabetic character. Although the various character input keys 504 may be utilized to enter both lowercase and uppercase alphabetic characters, only a single alphabetic character is assigned to each of the character input keys 504. Accordingly, the primary input mode may be considered to be a single alphabetic character input mode. In the secondary input mode, however, the various character input keys 504 are associated with multiple alphabetic characters. Accordingly, the primary input mode may be considered to be a multiple alphabetic character input mode.

Figure 7:
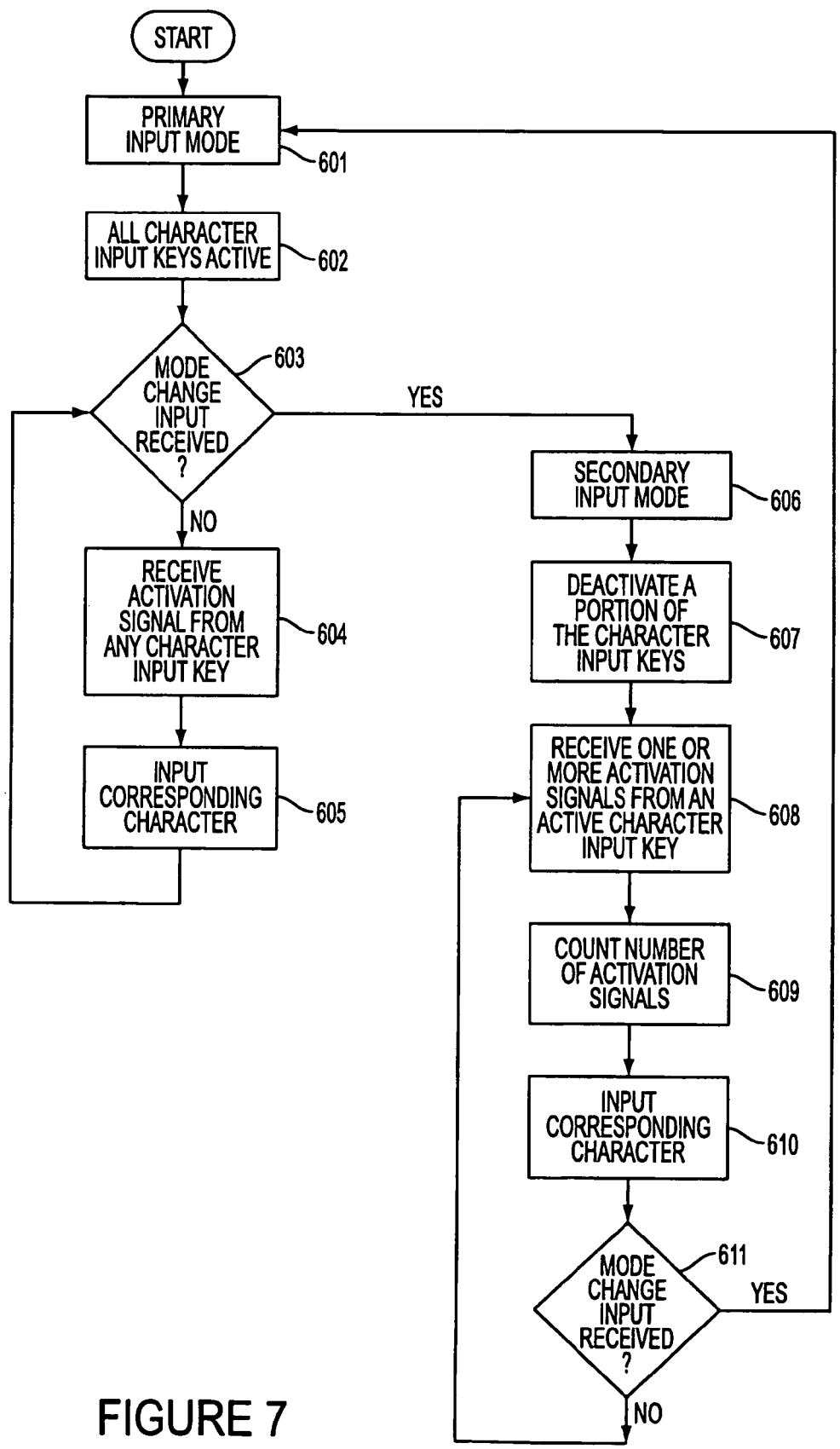
FIG. 7 is a flow diagram illustrating a process of inputting characters.

With reference to FIG. 7, a flow diagram illustrating the general process of inputting characters is provided. Initially, the character input portion 500 is set to the primary input mode (step 601). In the primary input mode, all of the character input keys 504 are active and may be activated by the user (step 602). At this stage, the user may opt to input characters in either the primary input mode or the secondary input mode. If no mode change input is received (step 603), then an activation signal is received from any of the character input keys (step 604) and a corresponding character is input (step 605). Steps 604 and 605 may repeat indefinitely until the user opts to provide mode change input.

In step 603 the user may have provided mode change input. As discussed above, mode change input may be provided by activating the third mode-altering key 510, for example. When the mode change input is received, the character input portion 500 is set to the secondary input mode (step 606). In the secondary input mode, a portion of the character input keys 504 are deactivated (step 607). Accordingly, the various character input keys 504 positioned outside of the area 544 are deactivated. One or more activation signals are then received from one of the active character input keys 504 (step 608). As discussed above, for example, once activating the Y key 504 inputs the lowercase alphabetic character "a", twice activating the Y key 504 inputs the lowercase alphabetic character "b", and thrice activating the Y key 504 inputs the lowercase alphabetic character "c". Accordingly, one or more activation signals may be received from the active character input keys 504. The number of activation signals received are then counted (step 609) and a corresponding character is input (step 610).

Following the input of a corresponding character in step 610, mode change input may or may not be received (step 611). If mode change input is not received, then steps 608, 609, and 610 will proceed again. If, however, mode change input is received, then the character input portion 500 is set to the primary input mode.

Based upon the above discussion, the character input portion 500 may be utilized in the primary input mode or the secondary input mode to input characters. In the primary input mode the user will once activate a specific character input key 504 to input a corresponding character. If the user twice activates the specific character input key 504, then two of the corresponding characters will be activated. In the secondary input mode a portion of the character input keys 504 is deactivated, thereby leaving another portion of the character input keys 504 active. If the user once activates one of the active character input keys 504, then a first character is input. Similarly, two activations of one of the active character input keys 504 inputs a second character, three activations of one of the active character input keys 504 inputs a third character, etc. The character input portion 500 provides, therefore, two different input modes that the user may select.

Further Character Input Portion Configurations

Figure 8:
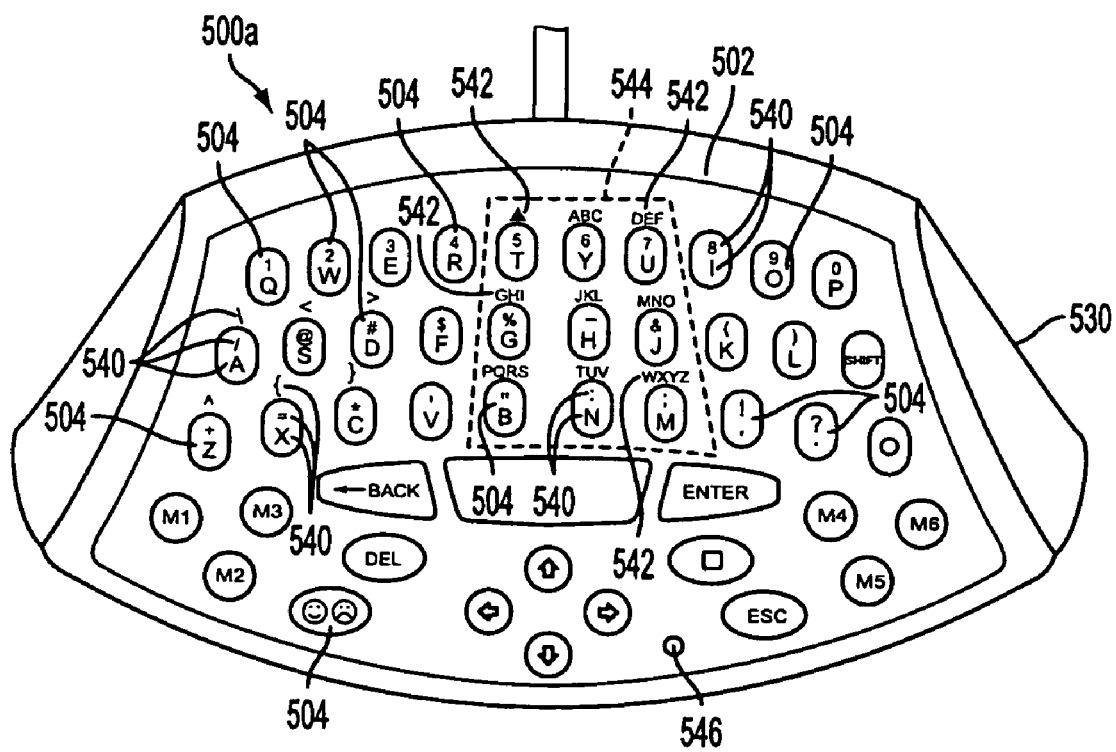
FIG. 8 is a top plan view of a second character input portion with a second character configuration.

The configuration of the character input portion 500 depicted in FIGS. 4-6 provides one example of a suitable configuration for the present invention. One skilled in the relevant art will recognize, however, that a plurality of configurations may be utilized within the scope of the present invention. Referring to FIG. 8, a character input portion 500*a* is depicted. Whereas the character input portion 500 included a single primary character identifier 540 for each character input key 504, the character input portion 500*a* includes multiple primary character identifiers 540 for each character input key 504. For example, the Q key 504 has primary character identifiers 540 that include a "Q" and a "1" that are positioned thereon. Similarly, the A key 504 has primary character identifiers 540 that include an "A" and a "/" that are positioned thereon, and the A key 504 has the primary character identifier 540 of "\" positioned adjacently.

In order to enter the various characters identified by the primary character identifiers 540, the mode-altering keys 506, 508, and 510 may be employed. In general, the mode-altering keys 506, 508, and 510 may be color-coded to correspond with the various primary character identifiers 540. For example, the "shift" indicia on the first mode-altering key 506 may have a black color that corresponds with the various alphabetic primary character identifiers 540 located on many of the character input keys 504. The circular indicia on the second mode-altering key 508 may have a blue color that corresponds with the various primary character identifiers 540 on many of the character input keys 504 and rearward of other primary character identifiers 540. Similarly, the third mode-altering key 510 may have a green color that corresponds with the various primary character identifiers 540 located on the housing 502 and adjacent to some of the character input keys 504. The black, blue, and green coloring of the mode-altering keys 506, 508, and 510, and the black, blue, and green coloring of the primary character identifiers 540, assist in alerting the user as to the relationships between the mode-altering keys 506, 508, and 510 and the specific character that will be inputted upon activating one of the character input keys 504.

Whereas the third mode-altering key 510 was utilized in the character input portion 500 for switching between the primary input mode and the secondary input mode, the third mode-altering key 510 may be utilized to input the various characters associated with the primary character identifiers 540 positioned on the housing 502. In order to switch between the primary input mode and the secondary input mode, a combination of different keys may be activated. For example, activating the first mode-altering key 506, then the second mode-altering key 508, and then the third mode-altering key 510 may switch between the primary input mode and the secondary input mode. Furthermore, thrice activating the third mode-altering key 510 may be another method of switching between the primary input mode and the secondary input mode. Alternately, the modifiable keys 524 may also be utilized for this purpose. Accordingly, a plurality of methods may be utilized to provide the mode change input.

Figure 9:
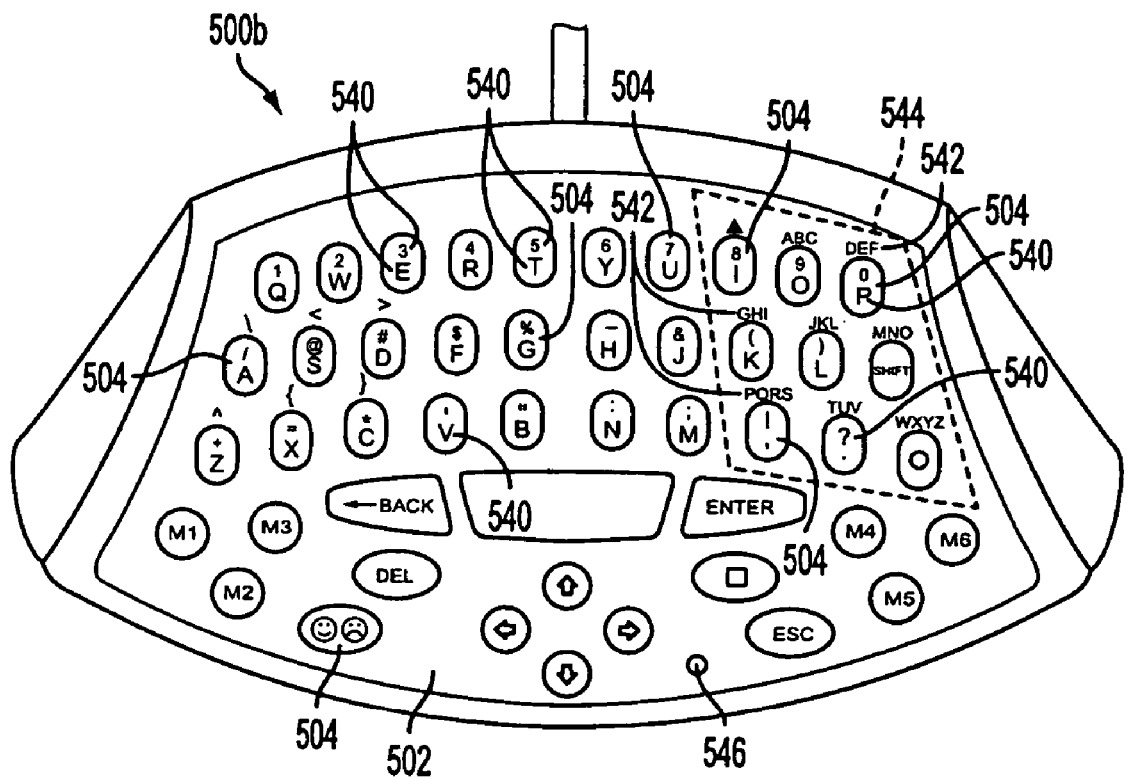
FIG. 9 is a top plan view of yet a third character input portion with a third character configuration.

The area 544 is positioned in a generally central portion of the character input portions 500 and 500*a*. In this position, the area 544 and the various character input keys 540 that are located within the area 544 are accessible by both thumbs of the user. As an alternative, the area 544 may also be positioned adjacent the right edge 530 or the left edge 532. Another character input portion 500*b* is depicted in FIG. 9 and the area 544 is positioned adjacent the right edge 530, for example. In this position, the first mode-altering key 506 and the second mode-altering key 508 are utilized for inputting text in the second mode.

Figure 10:
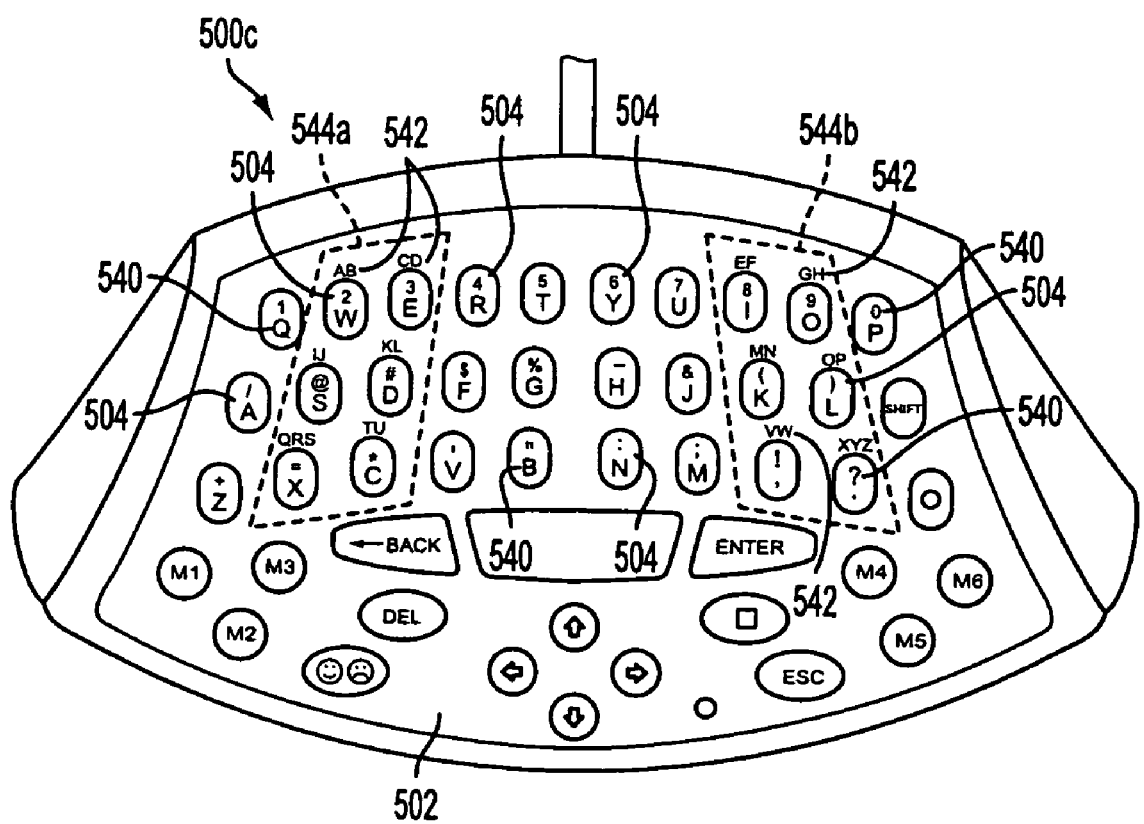
FIG. 10 is a top plan view of a fourth character input portion with a fourth character configuration.

The character input portions 500, 500*a*, and 500*b* include a single area 544 that includes the various character input keys 504 that are utilized for inputting characters in the second input mode. Referring to FIG. 10, however, a character input portion 500*c* has two areas 544*a* and 544*b* that each includes the character input keys 504 that are utilized for inputting characters in the second input mode. The position of the area 544*a* is accessible by the left thumb of the user, and the position of the area 544*b* is accessible by the right thumb of the user.

Based upon the above discussion, a character input portion falling within the scope of the present invention may have a plurality of different configurations. For example, the different configurations may include the specific characters that are associated with each of the character input keys 504 and the positions of the area 544. In addition, the types of characters that are input in each of the primary input mode and the secondary input mode may vary significantly. In addition to alphabetic characters, the primary input mode and second input mode may be utilized to enter numeric characters, various symbols, or the various characters utilized in Asian languages, for example.

As the user inputs characters to form words, the character input portion 500 of the game console 102 may attempt to predict the word that the user intends to input. For example, the user may attempt to input characters that form the word "device". Following the input corresponding with "dev", a remainder of the word "develop" may appear on a display device. As the word "develop" is not the intended input, the user may continue inputting characters. Following the input corresponding with "devi", a remainder of the word "device" may appear on a display device and the user may activate the enter key 516 to enter the remainder of the word. Accordingly, the input by the user may be predicted to assist in character input.

Various visual queues may be utilized to provide the user with an indication of the mode that the character input portion 500, or the character input portions 500a, 500b, and 500c, are in. For example, the character input portion 500 may include an indicator 546 located adjacent to front edge 528. The indicator 546 may be a light emitting diode that emits light when the character input portion 500 is in the secondary input mode. Alternately, each of the character input keys 504 may be backlit in the primary input mode, but only the character input keys 504 within the area 544 may be backlit in the secondary mode. That is, a contrast in illumination between the active and disabled character input keys 504 may be utilized.

Many individuals are familiar with the type of character input that is utilized in connection with a conventional keyboard, which is generally consistent with the single character input mode. Similarly, many individuals are also familiar with the type of character input that is utilized in connection with a conventional cellular telephone, which is generally consistent with the multiple character input mode. The present invention provides an input device permits the user to selectively operate under the single character input mode or the multiple character input mode. That is, the user may select to utilize either the single character input mode or the multiple character input mode, depending upon the preferences of the user.

The character input portion 500 and the operation of the character input portion 500 is disclosed with reference to gaming system 100. The present invention, however, has application to a wide variety of products where character input is utilized. For example, many portable electronic mail devices incorporate a keypad having individual keys for each alphabetic character. The present invention may be applied to such a portable electronic mail device to provide the user with the ability to select the single alphabetic character input mode or the multiple alphabetic character input mode. Conventional keyboards for personal computers may also benefit from the present invention. Accordingly, the present invention may be applied to a plurality of products, including personal computer systems and hand-held electronic devices, such as personal data assistants, for example, in addition to the specific applications related to gaming systems disclosed herein.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. A method of character input for a computing system with an input device having a game controller portion and character entry portion that includes a plurality of character keys, the method of character input comprising steps of:

allowing a user to selectively switch operation of the character keys of the character entry portion between a single alphabetic character input mode and a multiple alphabetic character input mode;

utilizing at least 26 character keys of the character entry portion when operating under the single alphabetic character input mode with each of the 26 character keys being associated with, and used to input, a predetermined single letter; and utilizing a subset of the 26 character keys of the character entry portion when operating under the multiple alphabetic character input mode with each key in the subset of the 26 character keys being associated with, and used to input, multiple letters.

2. The method recited in claim 1, further comprising a step of activating a key to change the operability of the character keys between the input modes.

3. The method recited in claim 1, further comprising a step of disabling character keys not within the subset.

4. The method recited in claim 3, wherein the utilizing a subset step includes utilizing a subset between exactly 9-12 character keys, and the disabling step includes disabling the other of the 26 character keys not within the subset.

5. The method recited in claim 1, wherein the utilizing a subset step includes activating character keys in the subset of character keys under an ambiguous key entry system such that the activation of a character key in the subset initially enters a selected one of multiple possible letters.

6. The method recited in claim 5, further comprising a step of utilizing a disambiguating routine to associate each character key with only one of the multiple possible letters.

7. The method recited in claim 1, wherein the utilizing a subset step includes activating each of the subset of character keys a predetermined number of times to provide an input of a selected one of the respective multiple letters associated with the keys.

8. The method recited in claim 1, further comprising a step of providing a contrast in illumination between the character keys within the subset and the character keys not within the subset when in the multiple alphabetic character input mode.

9. The method recited in claim 1, further comprising a step of separating the game controller portion and the character entry portion.

10. A method of character input for a computing system with an input device having a game controller portion and character entry portion that includes a plurality of character keys, the method of character input comprising steps of:

utilizing at least 26 character keys of the character entry portion when operating under a first key entry mode, wherein each of the 26 character keys are associated with, and used to input, a single alphabetic character;

changing the key entry mode from the first key entry mode to a second key entry mode;

utilizing a subset of the 26 character keys of the character entry portion when operating under the second key entry mode, wherein each of the character keys in the subset of the 26 character keys are associated with, and used to input, multiple alphabetic characters; and disabling the at least 26 character keys not within the subset in response to the changing step.

11. The method recited in claim 10, wherein the changing the key entry mode step includes activating a key to change from the first key entry mode to the second key entry mode.

12. The method recited in claim 10, further comprising a step of disabling character keys not within the subset.

13. The method recited in claim 10, wherein the utilizing a subset step includes utilizing a subset between exactly 9-12 character keys, and the disabling step includes disabling the other of the 26 character keys not within the subset.

14. The method recited in claim 10, wherein the utilizing a subset step includes activating character keys in the subset of character keys under an ambiguous key entry system such that the activation of a character key in the subset initially enters a selected one of multiple possible letters.

15. The method recited in claim 14, further comprising a step of utilizing a disambiguating routine to associate each character key with only one of the multiple possible letters.

16. The method recited in claim 10, further comprising a step of separating the game controller portion and the character entry portion.

17. A computer-readable storage medium comprising computer-executable instructions for character input for an input device having a game controller portion and character entry portion that includes a plurality of character keys, the instructions, when executed, perform acts of:
- allowing selectively switching of the character keys of the character entry portion between a single alphabetic character input mode and a multiple alphabetic character input mode;
- utilizing at least 26 character keys of the character entry portion when operating under the single alphabetic character input mode with each of the 26 character keys being associated with, and used to input, a predetermined single letter; and
- utilizing a subset of the 26 character keys of the character entry portion when operating under the multiple alphabetic character input mode with each key in the subset of the 26 character keys being associated with, and used to input, multiple letters.

18. The computer-readable medium of claim 17, the instructions further for activating a key to change the operability of the character keys between the input modes.

19. The computer-readable medium of claim 17, the instructions further for disabling character keys not within the subset.

* * * * *